United States Patent
Shaw et al.

(10) Patent No.: US 9,462,496 B2
(45) Date of Patent: Oct. 4, 2016

(54) AUTOMATED COMMUNICATIONS DEVICE FIELD TESTING, PERFORMANCE MANAGEMENT, AND RESOURCE ALLOCATION

(75) Inventors: Venson Shaw, Kirkland, WA (US); Steven Carlson, Atlanta, GA (US); Leland Yu, Kirkland, WA (US); Liping Zhang, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 830 days.

(21) Appl. No.: 12/643,284

(22) Filed: Dec. 21, 2009

(65) Prior Publication Data

US 2011/0151863 A1  Jun. 23, 2011

(51) Int. Cl.
*H04W 72/00* (2009.01)
*H04W 24/08* (2009.01)
*H04W 24/02* (2009.01)

(52) U.S. Cl.
CPC ............ *H04W 24/08* (2013.01); *H04W 24/02* (2013.01)

(58) Field of Classification Search
CPC .............. H04W 4/001; H04W 72/08; H04W 72/0493; H04L 47/10
USPC ...................................... 455/452.2; 370/252
See application file for complete search history.

(56) References Cited

U.S. PATENT DOCUMENTS

| | | | | |
|---|---|---|---|---|
| 6,980,523 B1 * | 12/2005 | Lipford et al. | | 370/252 |
| 2002/0058532 A1 * | 5/2002 | Snelgrove et al. | | 455/557 |
| 2003/0161265 A1 * | 8/2003 | Cao | | H04L 12/2697 370/229 |
| 2005/0048983 A1 * | 3/2005 | Abraham et al. | | 455/452.1 |
| 2008/0090547 A1 * | 4/2008 | Struhsaker | | 455/404.1 |
| 2008/0212567 A1 * | 9/2008 | El-Hennawey et al. | | 370/352 |
| 2009/0080451 A1 * | 3/2009 | Gogic | | 370/412 |

OTHER PUBLICATIONS

The CDMA2000 System for Mobile Communications by Vanghi, Damnjanovic, and Vojcic Chapter 6 © 2004.*

* cited by examiner

*Primary Examiner* — Joshua Schwartz
(74) *Attorney, Agent, or Firm* — Baker & Hostetler LLP (57) ABSTRACT

Field testing, performance monitoring, and resource management are performed via a communications device, automatically and autonomously, without user intervention. Abnormal conditions are automatically detected while the communications device is performing a service and adjustments are automatically made to network resources in order to improve service performance. Upon initiation of a request for service (e.g., IM, MMS, SMS, etc.), the communications device automatically begins to monitor the performance of the service session (e.g., send time, receive time, etc.). During or after the service session, the communications device stores the performance data associated with the performance of the service. The performance data is analyzed in accordance with a subscriber's user profile information, to detect any problems with the service. If problems are detected, necessary adjustments and/or reallocation of resources are made automatically and autonomously, without user intervention.

17 Claims, 7 Drawing Sheets

AUTOMATED COMMUNICATIONS DEVICE FIELD TESTING, PERFORMANCE MANAGEMENT, AND RESOURCE ALLOCATION

TECHNICAL FIELD

The technical field generally relates to field testing, performance management, and resource allocation, and more specifically relates to field testing, performance management, and resource allocation pertaining to communications devices in a communications system.

BACKGROUND

Field testing of a communications device in a communications network often is performed to achieve optimum service performance and to ensure a satisfactory user experience. It is not uncommon for service providers to spend large sums of money to mitigate problems associated with service performance quality. Typically, large numbers of human testers are employed to physically visit geographical regions in order to monitor the performance of communications devices in a live network. An example of this is illustrated in a current television commercial in which a team of testers ask "CAN YOU HEAR ME NOW?" Typically, human testers perform pre-defined tests and record test results for subsequent off-line analysis.

After analyzing test results, a service provider typically will survey network conditions using the field test data collected from the human testers to perform system analysis in order to identify any network resource shortages and/or problems. If problems or shortages are discovered, the service provider typically implants more network resources (e.g., a switch, a cellular tower, etc.) and/or reallocates network resources to resolve the problem.

This type of field testing, performance management, and resource allocation can be cumbersome, time consuming, non-real time, and expensive. For example, human testers can be expensive and the quality of work can be subjective and/or inconsistent. Each tester has individual subjective judgments which can cause a variation of quality standards on his/her work. Furthermore, this type of resource allocation and performance management is reactive and non-real time. Only samples of live network conditions are obtained. And, because live network condition continue to vary over time, a previously sampled network condition may not be appropriate for a current network condition. Additionally, service performance requirements for users vary from service to service (e.g., email, video, audio, game, etc.), and current field testing, performance management and allocation systems do not distinguish between a subscriber's status and service performance requirement in order to assign the appropriate resource.

SUMMARY

A communications device, such as a cellular phone for example, in conjunction with a communications network, automatically and without human intervention, perform various tasks related to field testing, performance management, and resource allocation. Field testing is performed, via the communications device, automatically and test results are provided to the communications network. The test results are analyzed via the communications network, automatically without human intervention. Results of the analysis are utilized to detect abnormal conditions, defects, shortages, performance issues, etc. Adjustments, corrections, and/or replacements are made automatically, without human intervention. In an example embodiment, profile information of a user/subscriber associated with the communications device is obtained and utilized to tailor any adjustments, corrections, and/or replacements to the user.

DETAILED DESCRIPTION OF ILLUSTRATIVE EMBODIMENTS

Mobiles devices are configured to automatically and without human intervention perform various tasks related to field testing, performance management, and resource allocation. For example, communications devices are configured to automatically perform field testing such that human testers are no longer required. In an example embodiment, the communications device autonomously sends results of the field testing via uplink communications channel or the like to a network entity, such as a server for example, in a communications network. The server is configured to automatically detect any abnormal conditions, defects, deficiencies, etc. while the communications device is performing a service. The server automatically makes adjustments to network resources in order to improve service performance as necessary. The server continuously and dynamically monitors the network condition and makes adjustments to network resources in order to sustain the service performance.

In an example embodiment, the communications device also is configured to distinguish and identify (via the communications device alone and/or via a network database) a subscriber profile of a user/subscriber associated with the communications device in order to tailor/customize performance of a service for the mobile user. The service request is automatically provided, as needed, to a server, profile database, and/or service performance database, or the like, in order to identify the appropriate service level performance requirement needed for the user.

In an example embodiment, the communications device associates field testing service performance data with the subscriber profile information so that the service performance can be customized to the relative privilege and priority of the subscriber. The communications device associates a service with a set of key performance indicators (KPIs) so that service performance can be customized to accommodate the subscriber's service performance requirement. The communications device uploads, to a communications network entity, the subscriber profile information, a service identifier, and the set of KPIs for each corresponding service when the service request is launched. The communications device next automatically monitors the service performance based on the set of KPIs. In an example embodiment a service performance score is calculated, such as for example a mean opinion score (MOS) indicating the perceived quality of received media. For example, an MOS can be expressed numerically, from 1 to 5, 1 being the worst and 5 the best. MOS is based figures that result from what is perceived by people during tests, such as for example, 5 is perfect—like face-to-face conversation or radio reception; 4 is fair—imperfections can be perceived, but sound still clear; 3 is annoying; 2 is very annoying, nearly impossible to communicate; and 1 is impossible to communicate. The communications device provides, to the network entity, the performance score if service performance is determined to be not satisfactory. The network entity then initiates adjustment of network resource as needed. Upon improvement of the service, the communications device informs the network entity that the service performance is improved and the performance score is satisfactory.

Figure 1:
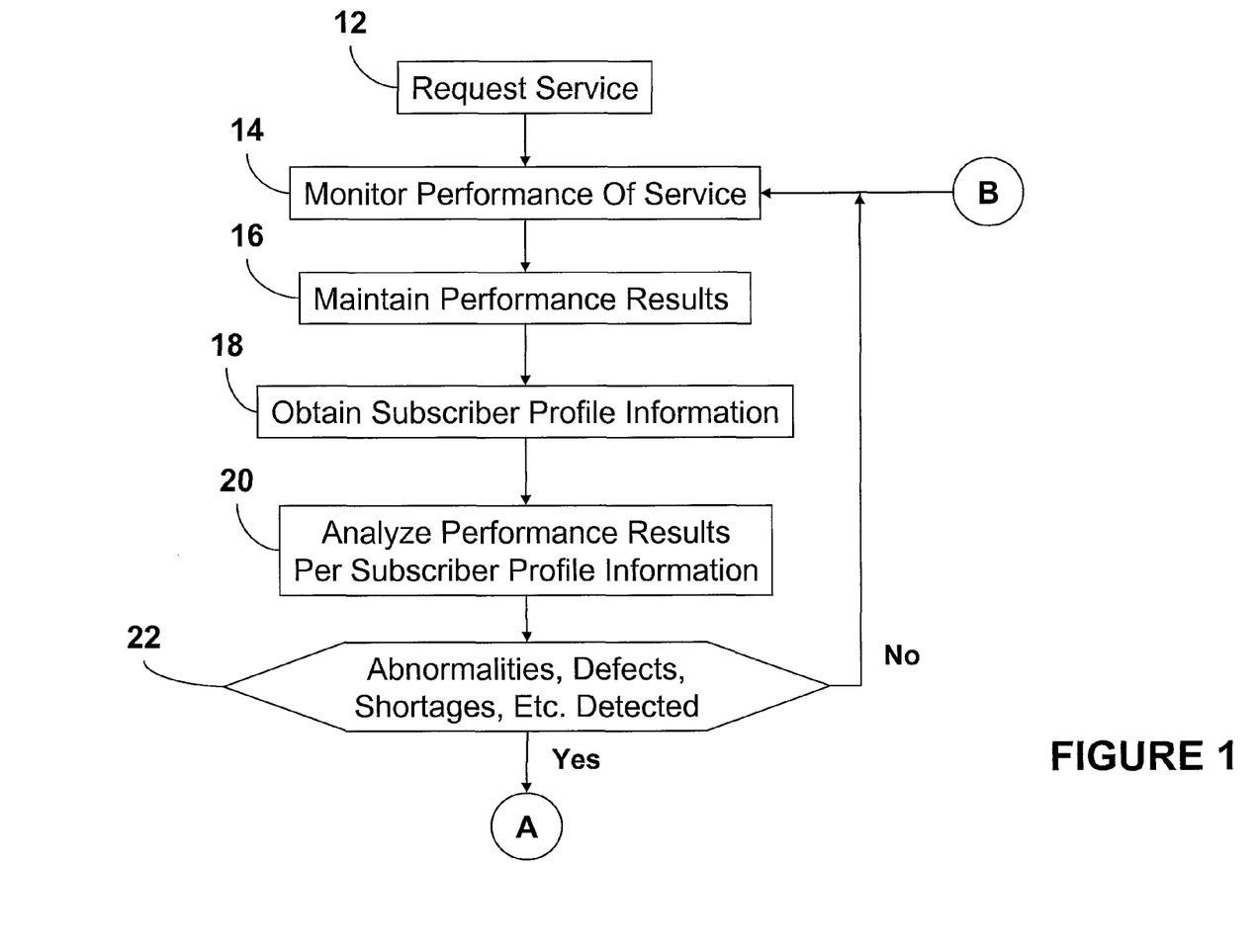
FIG. 1 is a flow diagram of an example process for automated communications device field testing, performance management, and resource allocation.

FIG. 1 is a flow diagram of an example process for automated communications device field testing, performance management, and resource allocation. In an example embodiment, field testing is performed by monitoring the performance of a service. At step 12, a request for a service is initiated at a communications device. The service can be any appropriate service such as, for example, an instant messaging (IM) service, a multimedia service (MMS), a short messaging service (SMS), a voice service (a phone call), an email service, a connection to the Internet, or the like. The service can be an incoming service (e.g., incoming call, email, text, etc.) or an outgoing service (e.g., outgoing call, email, text, etc.).

In an example embodiment, a user of the communications device enters a request for the service, or accepts the service, via a user interface of the communications device. Upon initiation or receipt of the service, the performance of the service is monitored at step 14. Any appropriate characteristics and/or parameters of the service can be monitored. For example, the amount of time to send the request, the amount of time to receive a response, the quality of the service (e.g., quality of phone call, resolution of multimedia, etc.) can be is monitored. For example, in the case of a video streaming application, the video quality can be monitored by the delay of the start up time, the degradation of the individual image quality; the discontinuity of the frame sequences; the jittering of the image; pixilation, or the like. The results of monitoring are maintained at step 16. In example embodiments, the results are maintained by being stored in a memory of the communications device, the results are maintained by being stored in storage not on the communications device (e.g., external database), or a combination thereof.

At step 18, subscriber profile information is obtained for a subscriber associated with the communications device. A subscriber can be associated with a communications device via any appropriate means, such as via an international mobile subscriber identity (IMSI), or the like. For example, each subscriber can have one or more devices for using the services, and each device can be associated with a respective International Mobile Equipment Identity (IMEI). The device is identified by the IMSI. The subscriber is identified by a subscriber ID in the network and the MSISDN. In an example embodiment, the combination of the three defines the device, the subscriber, and the line used in a communication. For browsing or data session the device can send out a user agent string that declares its make/model, the IMSI is not sent in a browsing session. The subscriber profile information is indicative of services available to the subscriber and to the quality of services available to the subscriber. For example, and not intended to be limiting, subscriber profile information can include an indication as to whether the subscriber can receive and/or send text messages, whether the subscriber can receive and/or send email, whether the subscriber can receive and/or send email with multimedia attachments, whether the subscriber can receive and/or send video, applications available for download to the communications device, the resolution of multimedia/video, associated costs, or any combination thereof for example. The subscriber profile information can be obtained via any appropriate source. For example, subscriber profile information can be obtained via storage on the communications device such as memory (removable, non-removable, etc.), a subscriber identify module (SIM), or the like, via a communications network entity such as a server, a database, a Home Location Register (HLR), a Visitor Location Register (VLR), or the like, or any combination thereof.

At step 20, the performance results are analyzed per the subscriber profile information. That is, the performance of the service is analyzed as it applies to the subscriber. The performance can be analyzed by the communications device, via a communication network entity, or any combination thereof. As an example scenario, if the service request is for a download to the communications device of a video, and the subscriber profile information indicates that the subscriber is entitled to the maximum resolution high definition video downloads, the performance of the service could be analyzed to assess if video was successfully download and the resolution of the video. If any problems with the service exist, such as for example, anomalies, abnormal conditions, defects, shortages, problems with the service, or the like, they are detected at step 22. If there are no problems with the service as provided to the communications device, that is, if the service performance is satisfactory, the process proceeds to step 14 to continuously monitor the service performance.

Figure 2:
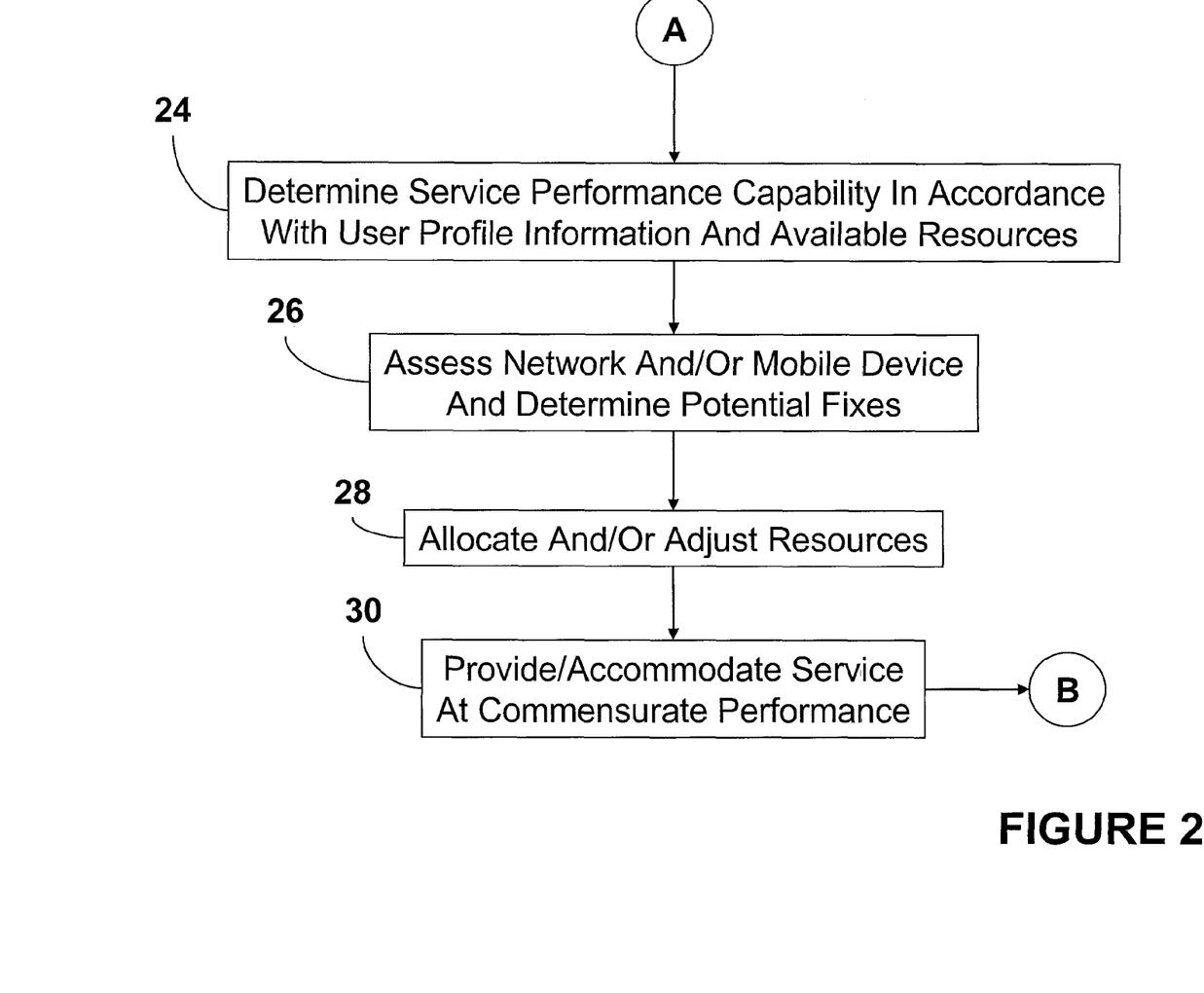
FIG. 2 is a continuation of the process depicted in FIG. 1.

If a problem with the service is detected at step 22, that is the service performance is not satisfactory, the process proceeds to step 24, as shown in FIG. 2, wherein the service performance capability is determined in accordance with the subscriber profile information and available resources. For example, referring to the above example scenario, if it is detected, during download, that the resolution of the downloaded video is less than the maximum resolution, the capabilities of the communications device and the communications network are analyzed to determine if maximum resolution video is capable of being downloaded.

At step 26, the communications network and/or the communications device are assessed and potential fixes are determined. For example, again referring to the above example scenario, if it is determined that the video was obtained from a database on which the video was stored in less than maximum resolution, the network could be assessed to determine if another database is available on which the video stored at maximum resolution. At step 28, resources are allocated and/or adjusted to improve/address/fix detected problems. For example, network resources including bandwidth, delay, and jitter can be assigned and reassigned via network elements including a GGSG, SGSN, and/or RNC. Resources on the device can include allocation of more/less power, memory, or processing time (for multitasking OS devices). In the case of Quality of Service (QoS), the device can request a higher level of QoS. The QoS can provide an indication of bandwidth, throughput, power, encoding schemes, etc., or any combination thereof. The network elements establish communications with the applications (e.g., video streaming) server so that the applications can inform the network elements regarding the requirement of the application. An example includes RSVP for video streaming, for which network resources can be reserved in order to allow the video streaming application to be performed.

Again referring to the above example scenario, the video would be obtained from the other database containing the maximum resolution video. Upon fixing any problems, the service, as updated to be commensurate with the appropriate performance, is provided at step 30. Thus, in the above example scenario the download of the video at less than maximum resolution would be halted, and the video obtained from the other database, at maximum resolution, would be downloaded to the communications device. The process then proceeds to step 14 to continuously monitor service performance.

It is to be understood that the process depicted in FIG. 1 and FIG. 2 occurs without user/subscriber intervention. Thus, the process is transparent to the user/subscriber. Service performance is continuously monitored and detected problems are rectified in real time. In various example embodiments, problems are detected and/or fixed during a service session or after a service session, depending upon the type of service and parameters monitored. For example, if the amount of time it takes to download a video to the communications device is being monitored, the detection of any problem and determination of potential fixes occurs after the service session is complete.

Figure 3:
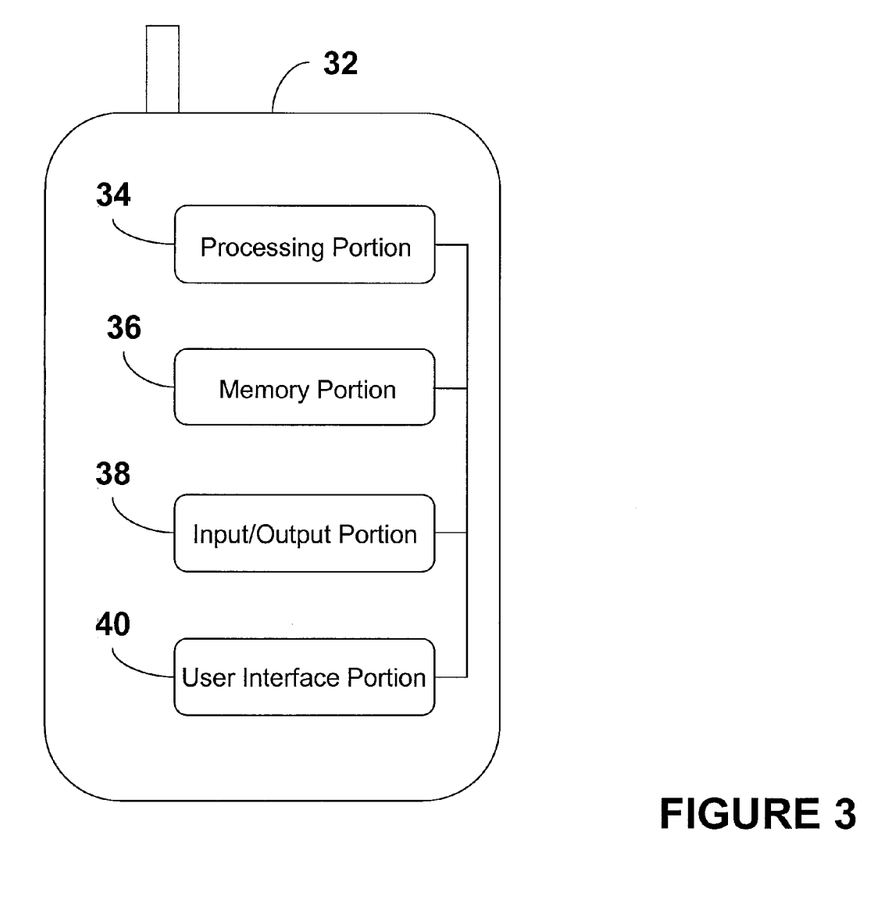
FIG. 3 is a block diagram of an example communications device configured to perform automated communications device field testing, performance management, and resource allocation.

FIG. 3 is a block diagram of an example communications device 32 configured to perform automated communications device field testing, performance management, and resource allocation. In an example configuration, communications device 32 is a mobile wireless device. The communications device 32 can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkmans, etc.), a portable navigation device (e.g., GPS compatible device, A-GPS compatible device, etc.), or a combination thereof. The communications device 32 can include devices that are not typically thought of as portable, such as, for example, a public computing device, a navigation device installed in-vehicle, a set top box, or the like. The mobile communications device 32 can include non-conventional computing devices, such as, for example, a kitchen appliance, a motor vehicle control (e.g., steering wheel), etc., or the like.

The communications device 32 can include any appropriate device, mechanism, software, and/or hardware for automated communications device field testing, performance management, and resource allocation as described herein. In an example embodiment, the ability to automatically perform field testing, performance management, and resource allocation is a feature of the communications device 32 that can be turned on and off. Thus, an owner of the communications device 32 can opt-in or opt-out of this capability.

In an example configuration, the communications device 32 comprises a processing portion 34, a memory portion 36, an input/output portion 38, and a user interface (UI) portion 40. It is emphasized that the block diagram depiction of communications device 32 is exemplary and not intended to imply a specific implementation and/or configuration. For example, in an example configuration, the communications device 32 comprises a cellular phone and the processing portion 34 and/or the memory portion 36 are implemented, in part or in total, on a subscriber identity module (SIM) of the mobile communications device 32. In another example configuration, the communications device 32 comprises a laptop computer. The laptop computer can include a SIM, and various portions of the processing portion 34 and/or the memory portion 36 can be implemented on the SIM, on the laptop other than the SIM, or any combination thereof.

The processing portion 34, memory portion 36, and input/output portion 38 are coupled together to allow communications therebetween. In various embodiments, the input/output portion 38 comprises a receiver of the communications device 32, a transmitter of the communications device 32, or a combination thereof. The input/output portion 38 is capable of receiving and/or providing information pertaining to automated communications device field testing, performance management, and resource allocation as described above. For example, the input/output portion 38 is capable of receiving and/or sending a request for a service, a download, service performance results, subscriber profile information, or the like, or any combination thereof, as described herein. In an example embodiment, the input/output portion 38 is capable of receiving and/or sending information to determine a location of the communications device 32. In an example configuration, the input\output portion 38 comprises a GPS receiver. In various configurations, the input/output portion 38 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 34 is capable of performing functions pertaining to automated communications device field testing, performance management, and resource allocation as described above. For example, the processing portion 34 is capable of, alone and/or in conjunction with a communications network entity, requesting/initiating a service, monitoring performance of a service, maintaining performance results, obtaining subscriber profile information, analyzing service performance results per subscriber profile information, detecting problems, anomalies, abnormalities, shortages, defects, determining service performance capability in accordance with the subscriber profile information and available resources, assessing network capabilities, assessing communication device capabilities, determining potential fixes, allocating resource, providing/accommodating a service at an appropriate commensurate performance, or the like, or any combination thereof, as described above.

In a basic configuration, the communications device 32 can include at least one memory portion 36. The memory portion 36 can store any information utilized in conjunction with automated communications device field testing, performance management, and resource allocation as described above. For example, the memory portion 36 is capable of storing information pertaining to location of a communications device, subscriber profile information, subscriber identification information, service performance information, service performance analysis results, parameters and/or characteristics to monitor, information pertaining to service problems, anomalies, abnormalities, shortages, defects, or a combination thereof, information pertaining to communication device capabilities, information pertaining to network capabilities, or the like, or any combination thereof, as described above. Depending upon the exact configuration and type of processor, the memory portion 36 can be volatile (such as some types of RAM), non-volatile (such as ROM, flash memory, etc.), or a combination thereof. The communications device 32 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 32.

The communications device 32 also can contain a UI portion 40 allowing a user to communicate with the communications device 32. The UI portion 40 is capable of rendering any information utilized in conjunction with automated communications device field testing, performance management, and resource allocation as described above. For example, the UI portion 40 can provide means for requesting/initiating a service, rendering text, rendering images, rendering multimedia, rendering sound, rendering video, or the like, as described above. The UI portion 40 can provide the ability to control the communications device 32, via, for example, buttons, soft keys, voice actuated controls, a touch screen, movement of the mobile communications device 32, visual cues (e.g., moving a hand in front of a camera on the mobile communications device 32), or the like. The UI portion 40 can provide visual information (e.g., via a display), audio information (e.g., via speaker), mechanically (e.g., via a vibrating mechanism), or a combination thereof. In various configurations, the UI portion 40 can comprise a display, a touch screen, a keyboard, an accelerometer, a motion detector, a speaker, a microphone, a camera, a tilt sensor, or any combination thereof. The UI portion 40 can comprise means for inputting biometric information, such as, for example, fingerprint information, retinal information, voice information, and/or facial characteristic information.

The communications device 32 can be part of and/or in communication with various wireless communications networks. Some of which are described below.

Figure 4:
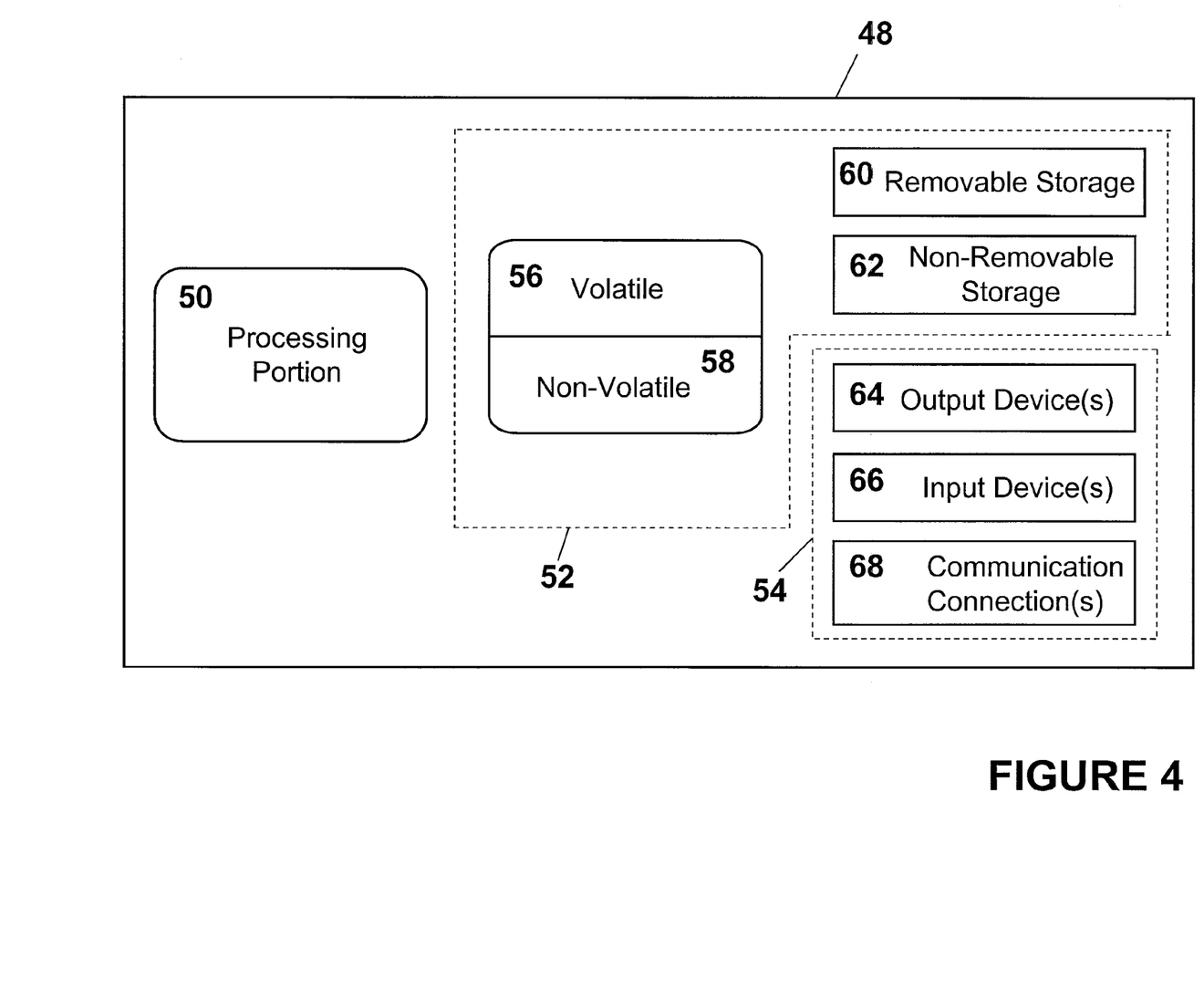
FIG. 4 is a block diagram of an example communications network entity configured to perform automated communications device field testing, performance management, and resource allocation.

FIG. 4 is a block diagram of an example communications network entity 48 for automated communications device field testing, performance management, and resource allocation, as described herein. The network entity 48 depicted in FIG. 4 can represent any appropriate device, examples of which include a processor, a computer, a server, a portable computing device, such as a laptop, a personal digital assistant ("PDA"), a portable phone (e.g., a cell phone or the like, a smart phone, a video phone), or any combination thereof. The network entity 48 depicted in FIG. 4 can represent any appropriate network entity, such as a processor, a server, a gateway, or the like, or any combination thereof. It is emphasized that the block diagram depicted in FIG. 4 is exemplary and not intended to imply a specific implementation or configuration. Thus, the network entity 48 can be implemented in a single processor or multiple processors (e.g., single server or multiple servers, single gateway or multiple gateways, single network entity or multiple network entities). The network entity 48 can be distributed, centrally located, and/or integrated. Multiple components of the network entity 48 can communicate wirelessly, via hard wire, or a combination thereof.

In an example configuration, the network entity 48 comprises a processing portion 50, a memory portion 52, and an input/output portion 54. The processing portion 50, memory portion 52, and input/output portion 54 are coupled together (coupling not shown in FIG. 4) to allow communications therebetween. The input/output portion 54 is capable of receiving and/or providing information pertaining to automated communications device field testing, performance management, and resource allocation as described above. In an example embodiment, the input/output portion 54 is capable of receiving/providing a request for a service, a download, service performance results, subscriber profile information, or the like, or any combination thereof, as described herein. In an example configuration, the input/output portion 54 comprises a GPS receiver. In various configurations, the input/output portion 54 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), wired means, or a combination thereof.

The processing portion 50 is capable of performing functions pertaining to automated communications device field testing, performance management, and resource allocation as described above. For example, the processing portion 50 is capable of, alone or in conjunction with a communications device, requesting/initiating a service, monitoring performance of a service, maintaining performance results, obtaining subscriber profile information, analyzing service performance results per subscriber profile information, detecting problems, anomalies, abnormalities, shortages, defects, determining service performance capability in accordance with the subscriber profile information and available resources, assessing network capabilities, assessing communication device capabilities, determining potential fixes, allocating resource, providing/accommodating a service at an appropriate commensurate performance, or the like, or any combination thereof, as described above.

In a basic configuration, the network entity 48 can include at least one memory portion 52. The memory portion 52 can store any information utilized in conjunction with automated communications device field testing, performance management, and resource allocation as described above. For example, the memory portion 52 is capable of storing information pertaining to location of a communications device, subscriber profile information, subscriber identification information, service performance information, service performance analysis results, parameters and/or characteristics to monitor, information pertaining to service problems, anomalies, abnormalities, shortages, defects, or a combination thereof, information pertaining to communication device capabilities, information pertaining to network capabilities, or the like, or any combination thereof, as described above.

Depending upon the exact configuration and type of network entity 48, the memory portion 52 can include computer readable storage media that is volatile 56 (such as some types of RAM), non-volatile 58 (such as ROM, flash memory, etc.), or a combination thereof. The network entity 48 can include additional storage, in the form of computer readable storage media (e.g., removable storage 60 and/or non-removable storage 62) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 48.

The network entity 48 also can contain communications connection(s) 68 that allow the network entity 48 to communicate with other devices, network entities, terminations, or the like. A communications connection(s) can comprise communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. The term computer readable media as used herein includes both storage media and can include communication media. The system also can have input device(s) 66 such as keyboard, mouse, pen, voice input device, touch input device, etc. Output device(s) 64 such as a display, speakers, printer, etc. also can be included.

Figure 5:
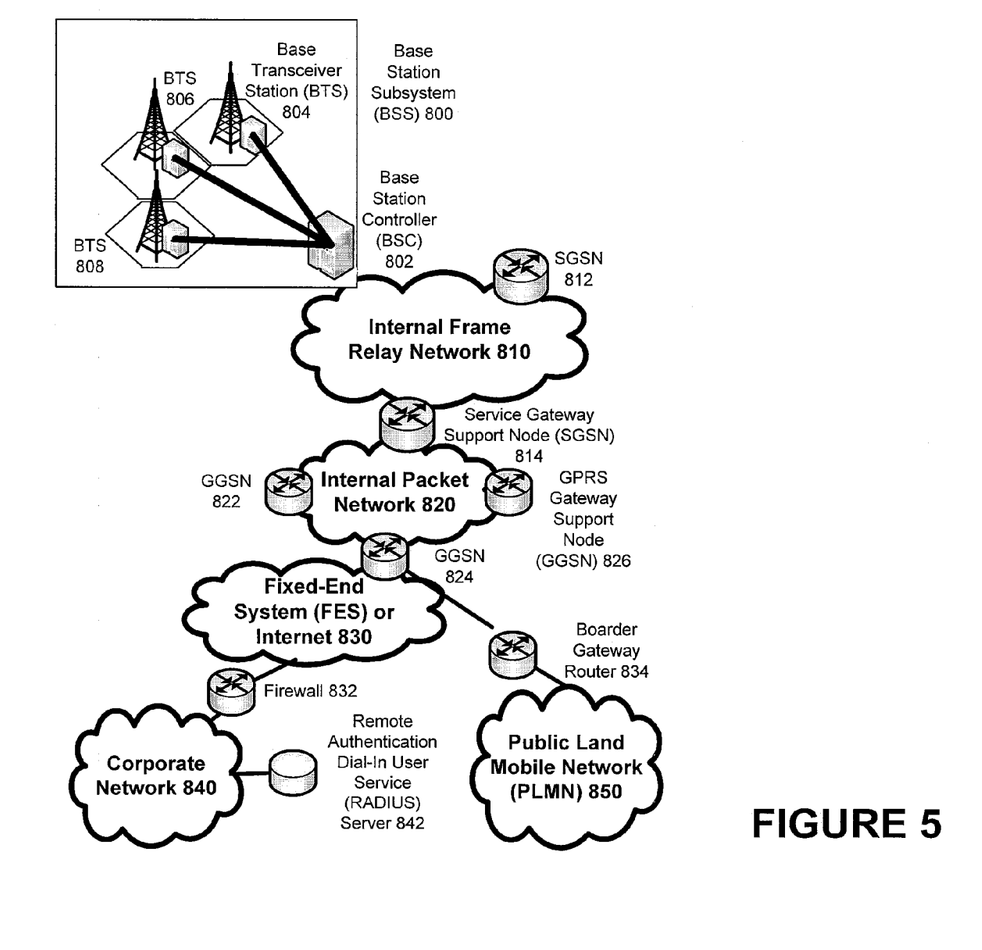
FIG. 5 depicts an overall block diagram of an exemplary packet-based mobile cellular network environment, such as a GPRS network, in which automated communications device field testing, performance management, and resource allocation can be implemented.

FIG. 5 depicts an overall block diagram of an exemplary packet-based mobile cellular network environment, such as a GPRS network, in which automated communications device field testing, performance management, and resource allocation can be implemented. In the exemplary packet-based mobile cellular network environment shown in FIG. 5, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In exemplary fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 6:
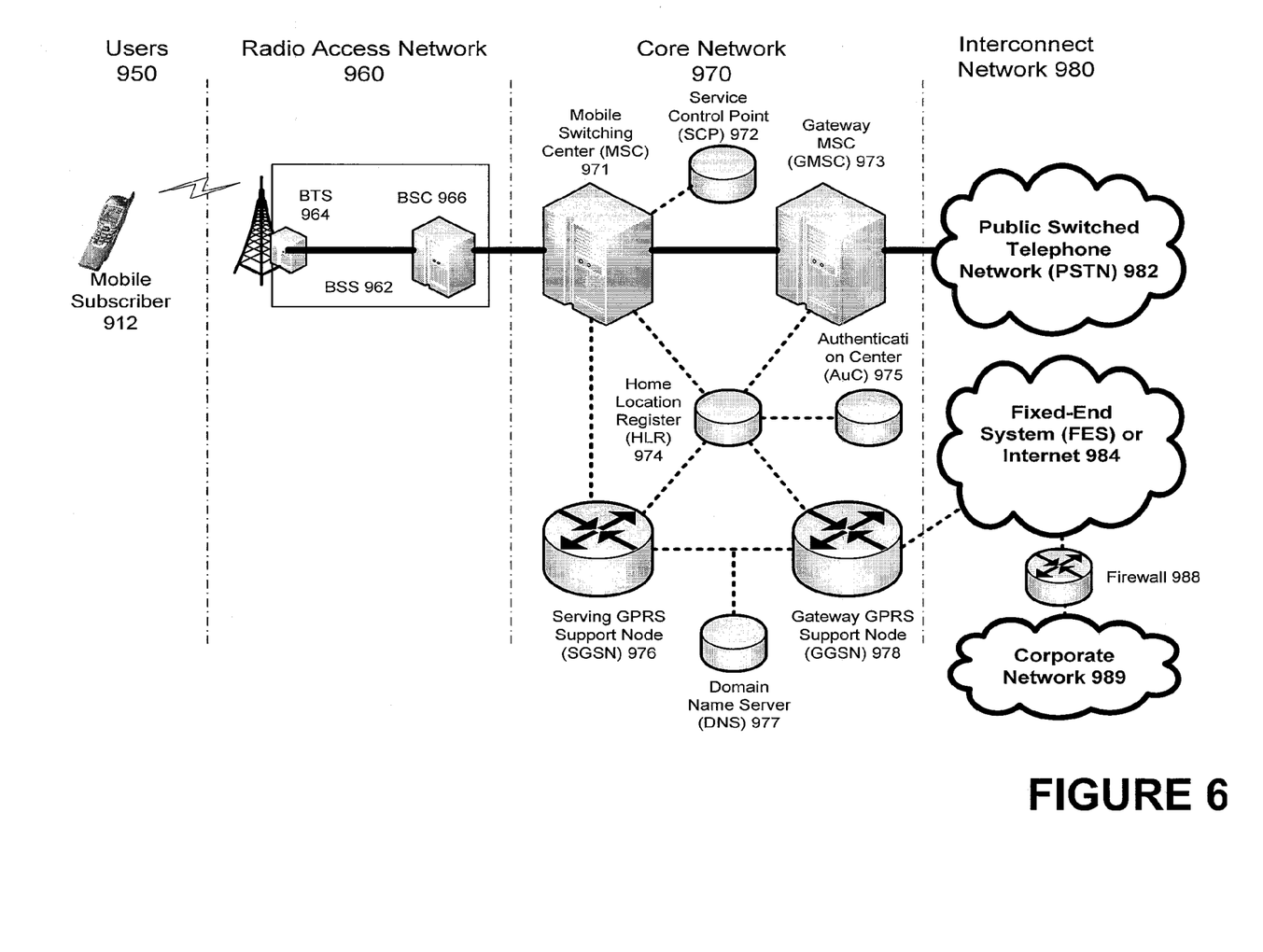
FIG. 6 illustrates an example architecture of a typical GPRS network in which automated communications device field testing, performance management, and resource allocation can be implemented.

FIG. 6 illustrates an architecture of a typical GPRS network in which automated communications device field testing, performance management, and resource allocation can be implemented. The architecture depicted in FIG. 6 is segmented into four groups: users 950, radio access network 960, core network 970, and interconnect network 980. Users 950 comprise a plurality of end users. Note, device 912 is referred to as a mobile subscriber in the description of network shown in FIG. 6. In an example embodiment, the device depicted as mobile subscriber 912 comprises a communications device (e.g., communications device 32). Radio access network 960 comprises a plurality of base station subsystems such as BSSs 962, which include BTSs 964 and BSCs 966. Core network 970 comprises a host of various network elements. As illustrated in FIG. 6, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 6, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 7:
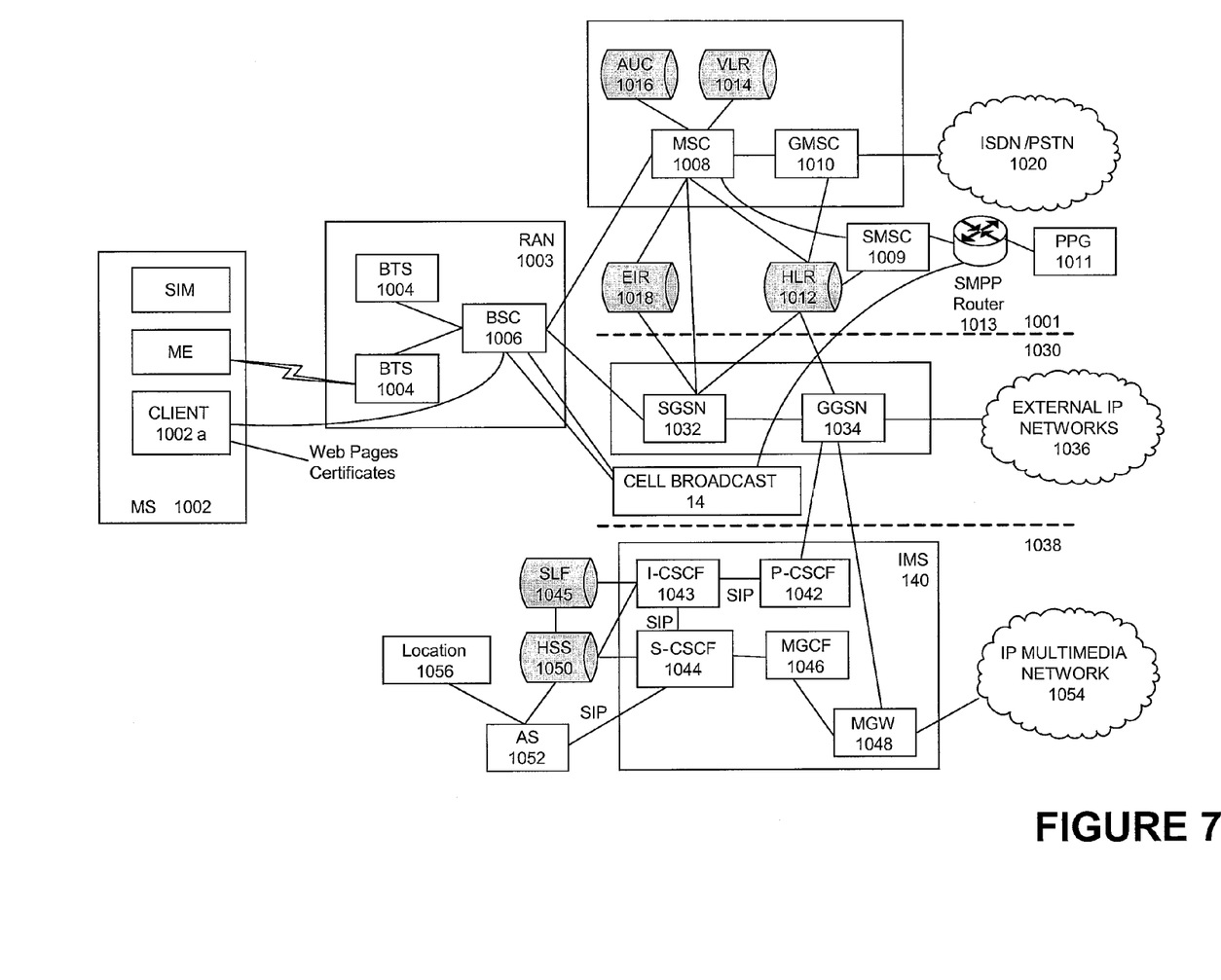
FIG. 7 illustrates an exemplary block diagram view of a GSM/GPRS/IP multimedia network architecture within which automated communications device field testing, performance management, and resource allocation can be implemented.

FIG. 7 illustrates an exemplary block diagram view of a GSM/GPRS/IP multimedia network architecture within which automated communications device field testing, performance management, and resource allocation can be implemented. As illustrated, the architecture of FIG. 7 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area.

Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users.

A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of automated communications device field testing, performance management, and resource allocation have been described in connection with various computing devices/processor, the underlying concepts can be applied to any computing device, processor, or system capable of determining propagation time. The various techniques described herein can be implemented in connection with hardware or software or, where appropriate, with a combination of both. Thus, the methods and apparatuses for automated communications device field testing, performance management, and resource allocation can be implemented, or certain aspects or portions thereof, can take the form of program code (i.e., instructions) embodied in tangible storage media, such as floppy diskettes, CD-ROMs, hard drives, or any other machine-readable storage medium (computer-readable storage medium), wherein, when the program code is loaded into and executed by a machine, such as a computer, the machine becomes an apparatus for automated communications device field testing, performance management, and resource allocation. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for automated communications device field testing, performance management, and resource allocation also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for automated communications device field testing, performance management, and resource allocation. When implemented on a general-purpose processor, the program code combines with the processor to provide a unique apparatus that operates to invoke the functionality of automated communications device field testing, performance management, and resource allocation. Additionally, any storage techniques used in connection with automated communications device field testing, performance management, and resource allocation can invariably be a combination of hardware and software.

While automated communications device field testing, performance management, and resource allocation has been described in connection with the various embodiments of the various figures, it is to be understood that other similar embodiments can be used or modifications and additions can be made to the described embodiments for automated communications device field testing, performance management, and resource allocation without deviating therefrom. For example, one skilled in the art will recognize that automated communications device field testing, performance management, and resource allocation as described in the present application may apply to any environment, whether wired or wireless, and may be applied to any number of such devices connected via a communications network and interacting across the network. Therefore, automated communications device field testing, performance management, and resource allocation should not be limited to any single embodiment, but rather should be construed in breadth and scope in accordance with the appended claims.

What is claimed:

1. A method comprising:
   receiving, via a communications device, an indication of a request for a service, wherein the request comprises:
   an identification of the communications device; and
   an identification of a subscriber associated with the communications device;
   continuously monitoring performance of the service based on a set of characteristics of the service;
   storing results of the performance of the service from the continuously monitoring step;
   obtaining, without intervention of a user of the communications device, subscriber profile information, wherein the subscriber profile information is based on the subscriber and the device and is indicative of services available to the subscriber and to the quality of services available to the subscriber;
   determining customized performance of the service, wherein the customized performance is based on:
   the identification of the communication device;
   the subscriber;
   the subscriber profile information; and
   the results of the performance of the service that were stored from the continuously monitoring step;
   analyzing, without intervention of a user of the communications device, the customized performance;
   determining, in accordance with results of the analyzing, if the customized performance is satisfactory;
   when the customized performance is determined to be satisfactory, continuously monitoring performance of the service;
   when the customized performance is determined to be not satisfactory:
   performing an assessment of service performance capabilities of the communications device and a communications network within which the communications device is in communication wherein the assessment is based on the subscriber profile information, and available communications network resources;
   determining at least one resource in the communications device or the communications network that can be adjusted to improve the customized performance; and
   adjusting the at least one resource of at least one of the communications device or the communications network to adjust the customized performance.

2. The method of claim 1, wherein the analyzing comprises analyzing at least one of:
   an amount of time to send a request;
   an amount of time to receive a response to a request; or
   a quality of the service.

3. The method of claim 1, further comprising:
   calculating a score indicative of the customized performance; and
   determining if the customized performance is satisfactory in accordance with the score.

4. The method of claim 1, wherein the service comprises at least one of:
   a voice service;
   an instant messaging service;
   a multimedia service;
   a short messaging service; or
   an email service.

5. The method of claim 1, wherein the communications device comprises a mobile cellular communications device and the communications network comprises a cellular communications network.

6. A communications device comprising:
   a processor; and
   memory coupled to the processor, the memory comprising executable instructions that when executed by the processor cause the processor to effectuate operations comprising:

receiving an indication of a request for a service, wherein the request comprises:
  an identification of the communications device; and
  an identification of a subscriber associated with the communications device;
continuously monitoring the performance of the service based on a set of characteristics of the service;
storing results of the performance of the service from the continuously monitoring step;
obtaining, without intervention of a user of the communications device, subscriber profile information, wherein the subscriber profile information is based on the subscriber and the device and is indicative of services available to the subscriber and to the quality of services available to the subscriber;
determining customized performance of the service, wherein the customized performance is based on:
  the identification of the communication device;
  the subscriber;
  the subscriber profile information; and
  the results of the performance of the service that were stored from the continuously monitoring step;
analyzing, without intervention of a user of the communications device, the customized performance;
determining, in accordance with results of the analyzing, if the customized performance is satisfactory;
when the service performance is determined to be satisfactory, continuously monitoring the service performance;
when the customized performance is determined to be satisfactory, continuously monitoring the performance of the service;
when the customized performance is determined to be not satisfactory:
  performing an assessment of service performance capabilities of the communications device and a communications network within which the communications device is in communication wherein the assessment is based on the subscriber profile information and available communications network resources;
  determining at least one resource in the communications device or the communications network that can be adjusted to improve the customized performance; and
  adjusting the at least one resource of at least one of the communications device or the communications network to adjust the customized performance.

7. The communications device of claim 6, wherein the analyzing comprises analyzing at least one of:
  an amount of time to send a request;
  an amount of time to receive a response to a request; or
  a quality of the service.

8. The communications device of claim 6, the operations further comprising:
  calculating a score indicative of the customized performance; and
  determining if the customized performance is satisfactory in accordance with the score.

9. The communications device of claim 6, wherein the service comprises at least one of:
  a voice service;
  an instant messaging service;
  a multimedia service;
  a short messaging service; or
  an email service.

10. The communications device of claim 6, wherein the communications device comprises a mobile cellular communications device and the communications network comprises a cellular communications network.

11. The communications device of claim 6, the operations further comprising storing at least a portion of the subscriber profile information.

12. A network entity comprising:
a processor; and
memory coupled to the processor, the memory comprising executable instructions that when executed by the processor cause the processor to effectuate operations comprising:
  receiving an indication of a request for a service, wherein the request comprises:
    an identification of a communications device; and
    an identification of a subscriber associated with the communications device;
  continuously monitoring the performance of the service based on a set of characteristics of the service;
  storing results of the performance of the service from the continuously monitoring step;
  obtaining, without intervention of a user of the communications device, subscriber profile information, wherein the subscriber profile information is based on the subscriber and the device and is indicative of services available to the subscriber and to the quality of services available to the subscriber;
  determining customized performance of the service, wherein the customized performance is based on:
    the identification of the communication device;
    the subscriber;
    the subscriber profile information; and
    the results of the performance of the service that were stored from the continuously monitoring step;
  analyzing, without intervention of a user of the communications device, the customized performance;
  determining, in accordance with results of the analyzing, if the customized performance is satisfactory;
  when the customized performance is determined to be satisfactory, continuously monitoring performance of the service;
  when the customized performance is determined to be satisfactory, continuously monitoring the customized performance;
  when the customized performance is determined to be not satisfactory:
    performing an assessment of service performance capabilities of the communications device and a communications network within which the communications device is in communication wherein the assessment is based on the subscriber profile information, the capability of the communications device and available communications network resources; and
    adjusting a resource of at least one of the communications device or the communications network to adjust the customized performance.

13. The network entity of claim 12, wherein the analyzing comprises analyzing at least one of:
  an amount of time to send a request;
  an amount of time to receive a response to a request; or
  a quality of the service.

14. The network entity of claim 12, the operations further comprising:
  calculating a score indicative of the customized performance; and determining if the customized performance is satisfactory in accordance with the score.

15. The network entity of claim 12, wherein the service comprises at least one of:
a voice service;
an instant messaging service;
a multimedia service;
a short messaging service; or
an email service.

16. The network entity of claim 12, wherein the communications device comprises a mobile cellular communications device and the communications network comprises a cellular communications network.

17. The network entity of claim 12, the operations further comprising storing at least a portion of the subscriber profile information.

* * * * *